May 11, 1965 D. J. MILLARD 3,182,565
PISTON LOCKING MEANS
Filed Jan. 17, 1963

Inventor
Dennis John Millard
By Stevens, Davis, Miller & Mosher
Attorneys 3,182,565
PISTON LOCKING MEANS
Dennis John Millard, Codsall, near Wolverhampton, England, assignor to Boulton Paul Aircraft Limited, near Wolverhampton, England
Filed Jan. 17, 1963, Ser. No. 252,245
Claims priority, application Great Britain, Jan. 19, 1962, 2,094/62
3 Claims. (Cl. 92—19)

The present invention relates to fluid pressure operated actuators including a ram and cylinder movable relatively to each other under the action of fluid pressure.

British Patent No. 899,514 relates to a fluid pressure operated actuator including a ram and a cylinder movable relatively to each other under the action of fluid pressure and having secured to them inter-engaging locking means for locking the ram and cylinder against such relative movement, the locking means being between the ram and cylinder and a chamber for pressure fluid, in which the locking means includes an inner member and an outer member designed for relative axial movement, one of the members having one or more projections designed to co-operate in the locked position with complementary recesses in the other member to prevent the relative movement between the members, the axial extent of the recesses or projections in the outer member being less than the range of movements of the ram and cylinder, the inner member being biased inwardly into the disengaged position and means being provided to move the inner member outwardly against the bias, to come into contact with the outer member, upon reduction of the fluid pressure in the chamber below a chosen value, after which relative axial movement of the inner and outer members is possible until the projections engage in the recesses to lock the ram and cylinder in a position defined by the recesses or projections in the outer member.

The present invention aims at improving this form of actuator to facilitate rapid engagement of the locking device by discharging the pressure fluid rapidly when it is desired to lock the actuator.

One example of an actuator of the present invention will now be described with reference to the accompanying drawings, in which.

Figure 1:
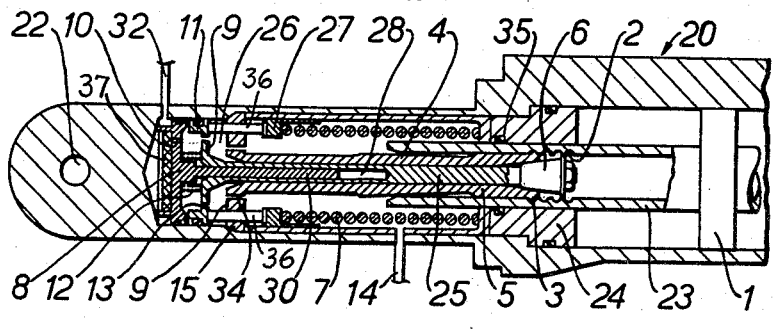
FIG. 1 is a sectioned side elevation of an actuator in the locked position.

All the parts shown in the three figures are identical and are therefore given the same references.

As will now be described with reference to FIG. 1 the actuator includes a cylinder 20 adapted to be connected to the frame of an aircraft by means of a bolt (not shown) passing through the aperture 22 at one end of the actuator. The ram 1 working in the cylinder is connected to a movable control surface (not shown). An extension 23 from one side of the ram is hollow and forms the outer member of the locking mechanism, the outer member having working in it an inner member 5. The extension 23 is provided with four axially-spaced circumferential recesses 2. Although four recesses are shown, a minimum of two may be provided, or more than four. The inner member 5 is designed to act in the manner of a spring collet and has projecting radially from it projections 3 which are complementary in shape with each of the recesses 2.

The inner member 5 is fixed relatively to a wall 24 closing one end of the cylinder 20, the extension 23 being designed to slide in the wall 24, seals 35 being provided to prevent the flow of fluid between the extension and the wall.

The inner member is designed to be expanded into locking engagement with the outer member by means of a frusto-conical expansion member 6 secured to the end of a rod 25 extending through the hollow centre of the shaft 4 connecting the expansion member 5 to a partition 15 connected to the cylinder 20. At the end opposite to the expansion member 6, the rod 25 is connected to a piston 11 adapted to work in a chamber 26 for the pressure fluid which controls the locking mechanism of the actuator. Chamber 26 is defined by the piston 8 and the partition 15.

The space between the partition 15, the shaft 4 and the wall 24 forms an auxiliary chamber adapted to be connected to a sump (not shown) through an outlet 14. Working in this chamber is a ring 27 from which project a plurality of rods 36 which slide in apertures in the partition 15 and which are designed to abut the piston 11 at their outer ends. The ring 27 is biased outwardly of the end wall 24 of the cylinder by a heavy duty spring 7.

The end of the rod 25 extending from the piston 11 is provided with an axially-extending passageway 28 in which works the stem 30 of a piston 8 working in the pressure chamber 26 and disposed between the piston 11 and the inlet 32 to the chamber. The function of the stem 30 is to keep the piston 8 aligned with the walls of the pressure chamber 26. Disposed between the piston 11 and the piston 8 is a light duty spring 12 acting to bias the pistons apart. The piston 8 acts to cut off the high pressure fluid entering the inlet 32 from the space between the pistons except for a narrow passageway 10 in the piston which presents a high impedance to fluid flow. Spacer members 37 are located at the intervals around the periphery of the piston 8. These spacer members are partially annular in shape and serve to prevent the piston 8 from moving to the extreme end of its travel (to the left as shown), in which position it would obstruct the outlet of pipe 32.

The partition 15 is provided with a plurality of passageways 34 and the piston 11 with a plurality of passageways 13 out of register with each other.

Figure 2:
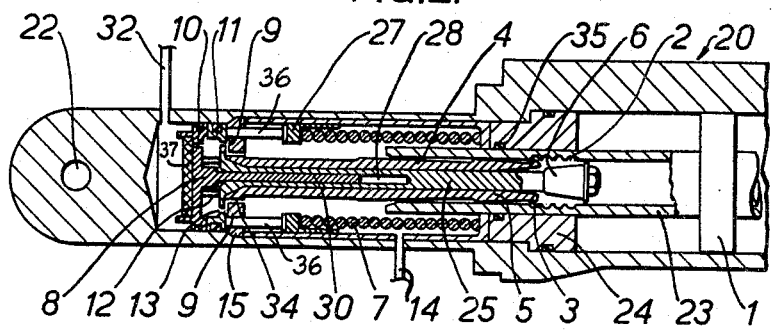
FIG. 2 is a view similar to FIG. 1 showing the actuator immediately after withdrawal from the locked position shown in FIG. 1.
Figure 3:
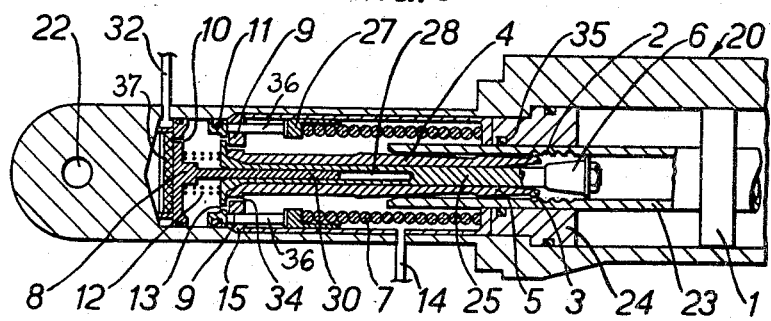
FIG. 3 is a view of the actuator showing it in the fully unlocked position.

The passageways 13 and 34 are designed so that when the wall 15 and piston 11 abut, as shown in FIGS. 2 and 3, the passageways are closed by seating members 9 mounted in the respective face of the opposite member.

In the position as shown in FIG. 1 the inlet 32 is in communication with the passageway 10, the passageways 13, the passageways 34 and the outlet 14.

Because there is no pressure difference across the various pistons and partitions when no fluid enters through inlet 32 the spring 7 is effective to push the ring 27 to the extreme left hand side in which the rods 36 contact the piston 11 and thereby advance the expansion member 6 into the inner member 5 to urge the projections 3 outwardly until they seat within the recesses 2.

For the actuator to be unlocked fluid under high pressure is introduced into the inlet 32. Because passageway 10 presents a high impedance to fluid flow a pressure differential is established across the piston 8 to urge it, with piston 11 and ring 27 to the right against the bias of spring 7. During this movement the expansion member is moved from the inner member 5 to permit it to flex inwardly under its natural bias until the projections 3 are totally out of engagement with the recesses 2. This is the position shown in FIG. 2, in which position the ram 1 and cylinder 20 are free for relative movement effected by differential pressures across the ram 1 in the cylinder.

After a time interval the pressures on both sides of the piston 8 are equalized by fluid flow through the passage 10. When this happens the spring 12 moves the piston 8 towards the inlet 32 until it comes into contact with the respective end of the pressure chamber 26. This position is shown in FIG. 3. It will be noted that in the position shown in FIGS. 2 and 3 the passages 13 and 34 in the piston 11 and wall 15 respectively are sealed.

When it is desired to lock the actuator to cause it to return to the position shown in FIG. 1 the pressure in chamber 26 is reduced to below a chosen value. As the pressure falls to this value fluid flows from between the pistons 8 and 11 into the pressure chamber 26 and out through the inlet 32. Owing to the small volume of this space a small volume of fluid flow through the passage 10 is effective to cause a pressure drop in this space, acting on the piston 11, sufficient for the spring 7 to be strong enough to move the piston 11 to the left. Immediately, as it does so, the passages 13 and 34 are opened and the space between the pistons 8 and 11 is placed into communication with the outlet 14. As these passages are of relatively wide bore compared with the passage 10 to the pressure and the resistance to motion of the piston 11 drop very quickly and the piston 11 is moved rapidly to the left by the spring 7. This results in a prompt movement to the locking position on a reduction of pressure in the chamber 26.

If the inner and outer members are not in the relative position shown in FIG. 1 when the pressure is so reduced, locking of the actuator causes the expansion member 6 to be inserted into the inner member sufficiently to force the projections into contact with the inner walls of the outer member 23. In this position relative movement between the ram 1 and cylinder 20 is still possible against the friction applied between the inner and outer members. This relative movement takes place until the projections 3 drop into one or other of the recesses 2. These recesses and the projections are so positioned that the ram 1 is locked in a position relatively to the cylinder 20 such that the associated control surface is in a safe (neutral) position.

I claim:

1. In a fluid pressure operated actuator including a ram and a cylinder movable relative to each other under the action of fluid pressure and having secured to said ram and said cylinder inter-engaging locking means for locking the ram and cylinder against relative movement, the locking means comprising an inner member movable axially relative to an outer member, one of the members having at least one projection cooperable in the locked condition of the actuator with a complementary recess in the other member to prevent relative movement between the members, the axial extent of the recess in the outer member being less than the range of relative movement of the ram and cylinder; the improvement comprising an inherently resilient inner member biased by its own resilience into the disengaged position; means for expanding the inner member outwardly of the cylinder axis to cause the inner member to engage the outer member, said means comprising an expansion member connected to a first piston located within an auxiliary chamber structurally connected to the cylinder, a second piston located within the auxiliary chamber the latter being divided into a pressure chamber separated from an intermediate chamber by the second piston, and a sump chamber separated from the intermediate chamber by an apertured dividing wall, the first piston being slidable within the intermediate chamber between a first position in which the inner member is expanded into engagement with the outer member to lock the actuator and the first piston is remote from the dividing wall and a second position in which the inner member is in its non-expanded condition and the first piston is adjacent to the dividing wall, means for supplying fluid under pressure to the pressure chamber, means for exhausting fluid from the sump chamber, and at least one heavy duty spring located within the auxiliary chamber and acting to bias the first piston in an axial direction towards its first position, at least one light duty spring located within the auxiliary chamber and acting to bias the second piston away from the first piston, the second piston having extending through it at least one passageway presenting a high impedance to fluid flow from the pressure chamber to the intermediate chamber, and the first piston having extending through it at least one passageway not in registry with an aperture in the dividing wall whereby the passageway in the first piston in the second position thereof is closed by the dividing wall.

2. An actuator as claimed in claim 1, in which the apertured dividing wall has extending through it with a sliding fit a connector connecting the first piston to a ring slidably mounted in the auxiliary chamber, the ring being in contact with one end of the heavy duty spring and being biased by the latter towards the said dividing wall.

3. An actuator as claimed in claim 1, in which the outer member is integral with the ram of the actuator and is mounted for sliding movement in an end wall of the cylinder of the actuator, the outer member being provided with two or more axially spaced apart recesses, and in which the inner member is in the form of a spring collet having extending radially outwardly therefrom a plurality of projections complementary to the recesses in the outer member.

References Cited by the Examiner

UNITED STATES PATENTS

| | | | |
|---|---|---|---|
| 153,720 | 8/74 | Munger | 294—86.25 X |
| 718,066 | 1/03 | McWilliams | 294—86.25 |
| 929,526 | 7/09 | Whitman | 294—94 X |
| 2,744,501 | 5/56 | Chace et al. | 92—25 |
| 3,003,471 | 10/61 | Bodem et al. | 92—24 |
| 3,107,933 | 10/63 | Royster | 92—25 X |

ARTHUR L. LA POINT, *Primary Examiner.*